US 7,576,511 B2

(12) United States Patent
Takahashi et al.

(10) Patent No.: US 7,576,511 B2
(45) Date of Patent: Aug. 18, 2009

(54) MOTOR CONTROL DEVICE AND MOTOR CONTROL METHOD

(75) Inventors: Hisayoshi Takahashi, Utsunomiya (JP); Tetsu Sugiyama, Utsunomiya (JP); Shintaro Uchida, Karasuyama (JP)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 11/704,971

(22) Filed: Feb. 12, 2007

(65) Prior Publication Data

US 2007/0205743 A1 Sep. 6, 2007

(30) Foreign Application Priority Data

Feb. 20, 2006 (JP) ............... 2006-042175

(51) Int. Cl.
*H02P 27/04* (2006.01)
(52) U.S. Cl. .................. 318/807; 318/268; 318/717; 318/767
(58) Field of Classification Search ............. 318/268, 318/717, 767, 807
See application file for complete search history.

(56) References Cited

U.S. PATENT DOCUMENTS

| | | | | |
|---|---|---|---|---|
| 6,014,007 A * | 1/2000 | Seibel et al. | ................. | 318/805 |
| 6,046,553 A * | 4/2000 | Matsunaga et al. | .......... | 318/139 |
| 6,069,467 A * | 5/2000 | Jansen | ........................ | 318/802 |
| 6,147,470 A * | 11/2000 | Ohashi et al. | ............... | 318/757 |
| 6,184,648 B1 * | 2/2001 | Kato et al. | ................. | 318/811 |
| 6,208,109 B1 * | 3/2001 | Yamai et al. | ................ | 318/716 |
| 6,259,226 B1 * | 7/2001 | Kaitani et al. | ............... | 318/798 |
| 6,377,017 B2 * | 4/2002 | Kondou et al. | .............. | 318/727 |
| 6,531,843 B2 * | 3/2003 | Iwaji et al. | ................... | 318/727 |
| 6,690,137 B2 * | 2/2004 | Iwaji et al. | ................... | 318/700 |
| 6,727,675 B2 * | 4/2004 | Yoshimoto et al. | .......... | 318/700 |
| 6,954,050 B2 * | 10/2005 | Tobari et al. | ................ | 318/717 |
| 2003/0030404 A1 * | 2/2003 | Iwaji et al. | ................... | 318/700 |
| 2003/0155878 A1 * | 8/2003 | Murai | ........................ | 318/268 |
| 2006/0192510 A1 * | 8/2006 | Okazaki et al. | ............. | 318/139 |

FOREIGN PATENT DOCUMENTS

| | | |
|---|---|---|
| EP | 1 311 060 A2 | 5/2003 |
| JP | 9-172791 A | 6/1997 |
| JP | 2000-116176 A | 4/2000 |

OTHER PUBLICATIONS

European Search Report for 07102264 mailed Jun. 20, 2007.

* cited by examiner

*Primary Examiner*—Bentsu Ro
*Assistant Examiner*—David S Luo
(74) *Attorney, Agent, or Firm*—Westerman, Hattori, Daniels & Adrian, LLP.

(57) ABSTRACT

The present invention employed a motor control device including: current sensors which detect currents in each phase of a three-phase motor; a coordinate conversion device which computes a d-axis actual current and a q-axis actual current in dq-coordinates from phase currents of three phases based on detection values of the current sensors; a voltage instruction computation device which computes a d-axis voltage instruction and a q-axis voltage instruction based on a deviation between a d-axis current instruction and the d-axis actual current and on a deviation between a q-axis current instruction and the q-axis actual current; a target phase current computation device which computes target phase currents for each phase from the d-axis current instruction and the q-axis current instruction; and a current difference computation device which computes, for each phase, a current difference between the phase current and the target phase current.

5 Claims, 3 Drawing Sheets

MOTOR CONTROL DEVICE AND MOTOR CONTROL METHOD

Priority is claimed on Japanese Patent Application No. 2006-042175, filed Feb. 20, 2006, the contents of which are incorporated herein by reference.

BACKGROUND OF THE INVENTION

1. Field of the Invention

The present invention relates to a motor control device and a motor control method.

2. Description of the Related Art

In the prior art, control devices have been known which includes: a first estimation device which includes current sensors for detecting the current for each of the phases of, for example, a three-phase AC motor, and which estimates the current value of any one phase among the three phases from detection values of the current sensors for the other two phases; a second estimation device, for estimating the current value of any one phase among the three phases from the phase angle of current supplied to the three-phase AC motor and from detection values of current sensors for the other two phases; and a malfunction detection portion which, based on detection values of current sensors and on current values estimated by the first and second estimation devices, judges whether there is a malfunction in the current sensors for each phase, and upon judging that the current sensor for any phase among the three phases is malfunctioning, uses the current value estimated for the phase corresponding to the malfunctioning current sensor in calculations of motor control currents (see, for example, Japanese Unexamined Patent Application, First Publication No. 2000-116176).

In this control device, the outputs of current sensors for each phase are input to the malfunction detection portion, and current estimation values are estimated in the malfunction detection portion based on detection values for current sensors; in addition, malfunctions of current sensors are judged based on each of these current estimation values, and motor control currents are output in response to this judgment result.

However, when as a result of comparison of current values based on the detection values of a plurality of current sensors, as in the above-described control device of the prior art, that is, when malfunctioning of current sensors for each phase is judged according to the result of judgments as to whether detection values of a plurality of current values and the current estimation values based on detection values of a plurality of current sensors are the same, it is assumed that the detection value of each current sensor is the value for an equivalent phase angle. For this reason, the precision of detection timing of each of the current sensors makes a relatively large contribution to malfunction judgments for each current sensor, and so there may be difficulty in continuing output of appropriate motor control currents.

The present invention was made in view of the above circumstances, and has an object of providing a motor control device and a motor control method enabling continuation of appropriate control of a three-phase AC motor.

SUMMARY OF THE INVENTION

The present invention adopts the followings in order to achieve the above object.

A motor control device including: current sensors which detect currents in each phase of a three-phase motor; a coordinate conversion device which computes a d-axis actual current and a q-axis actual current in dq-coordinates from phase currents of three phases based on detection values of the current sensors; a voltage instruction computation device which computes a d-axis voltage instruction and a q-axis voltage instruction based on a deviation between a d-axis current instruction and the d-axis actual current and on a deviation between a q-axis current instruction and the q-axis actual current; a target phase current computation device which computes target phase currents for each phase from the d-axis current instruction and the q-axis current instruction; and a current difference computation device which computes, for each phase, a current difference between the phase current and the target phase current, wherein the coordinate conversion device computes the d-axis actual current and the q-axis actual current from the phase currents for the two phases excluding the phase corresponding to the largest of the current differences among the current differences of the three phases.

According to the motor control device, the three-phase motor is controlled based on detection values of the current sensors for two phases extracted from the three phases, excluding the one phase corresponding to the largest current difference based on the current differences between the current sensor detection values and the target phase currents calculated for each phase; hence, the three-phase motor can be controlled appropriately, based on phases for which following performance of current feedback control of the three-phase motor is relatively good.

The phase current setting device may continue an operation during controlling the three-phase motor.

In this case, a phase for which the following performance for current feedback control is relatively good may be appropriately extracted with the timing of each execution of a series of control operations throughout control of the three-phase motor, enabling continuation of appropriate control of the three-phase motor. By this device, unstable control of the three-phase motor resulting from detection values of a malfunctioning current sensor can be prevented more reliably than in cases in which, for example, current sensor anomalies are judged with appropriate timing, and detection values of current sensors used in control of the three-phase motor are selected from among the detection values of a plurality of current sensors according to the judgment results.

The motor control device may further include an anomaly judgment device which judges that the current sensor is anomalous when the phase corresponding to the largest current difference among the current differences for the three phases is the same over a predetermined period.

In this case, when the phase corresponding to the largest current difference among the current differences of the three phases is the same over a predetermined period, then it can be judged that, for example, fluctuations are occurring which exceed a predetermined fluctuation width of current differences for a normal current sensor; therefore, with this device, it is possible to judge appropriately whether a current sensor is anomalous or not.

Further, the present invention employed a motor control method including: a detection step of detecting current detection values for each of phases of a three-phase motor; a first computation step of computing a d-axis actual current and a q-axis actual current in dq-coordinates from phase currents for the three phases, based on the detection values; a second computation step of computing a d-axis voltage instructions and a q-axis voltage instructions based on a deviation between a d-axis current instruction and the d-axis actual current and on a deviation between a q-axis current instruction and the q-axis actual current; a third computation step of computing target phase currents for each phase from the d-axis current instruction and the q-axis current instruction; and a fourth computation step of computing current differences between the phase currents and the target phase currents for each phase. In the first computation step, the d-axis actual current and the q-axis actual current are computed from the phase currents for the other two phases excluding the phase corresponding to the largest current difference among the current differences for the three phases.

According to the motor control method, operations and advantageous effects similar to those of the above motor control device can be obtained.

DETAILED DESCRIPTION OF THE INVENTION

A motor control device and a motor control method according to one embodiment of the present invention will be explained below with reference to the attached drawings.

A motor control device 10 of the present embodiment drives and controls a brushless DC motor 11 (hereafter simply called a motor 1) mounted as the driving source in, for example, a hybrid vehicle, a fuel-cell vehicle, an electric motor vehicle, or another vehicle. This motor 11 includes a rotor (not shown) having permanent magnets which are utilized for magnetic fields, and a stator (not shown) which generates a rotating magnetic field to rotate the rotor.

Figure 1:
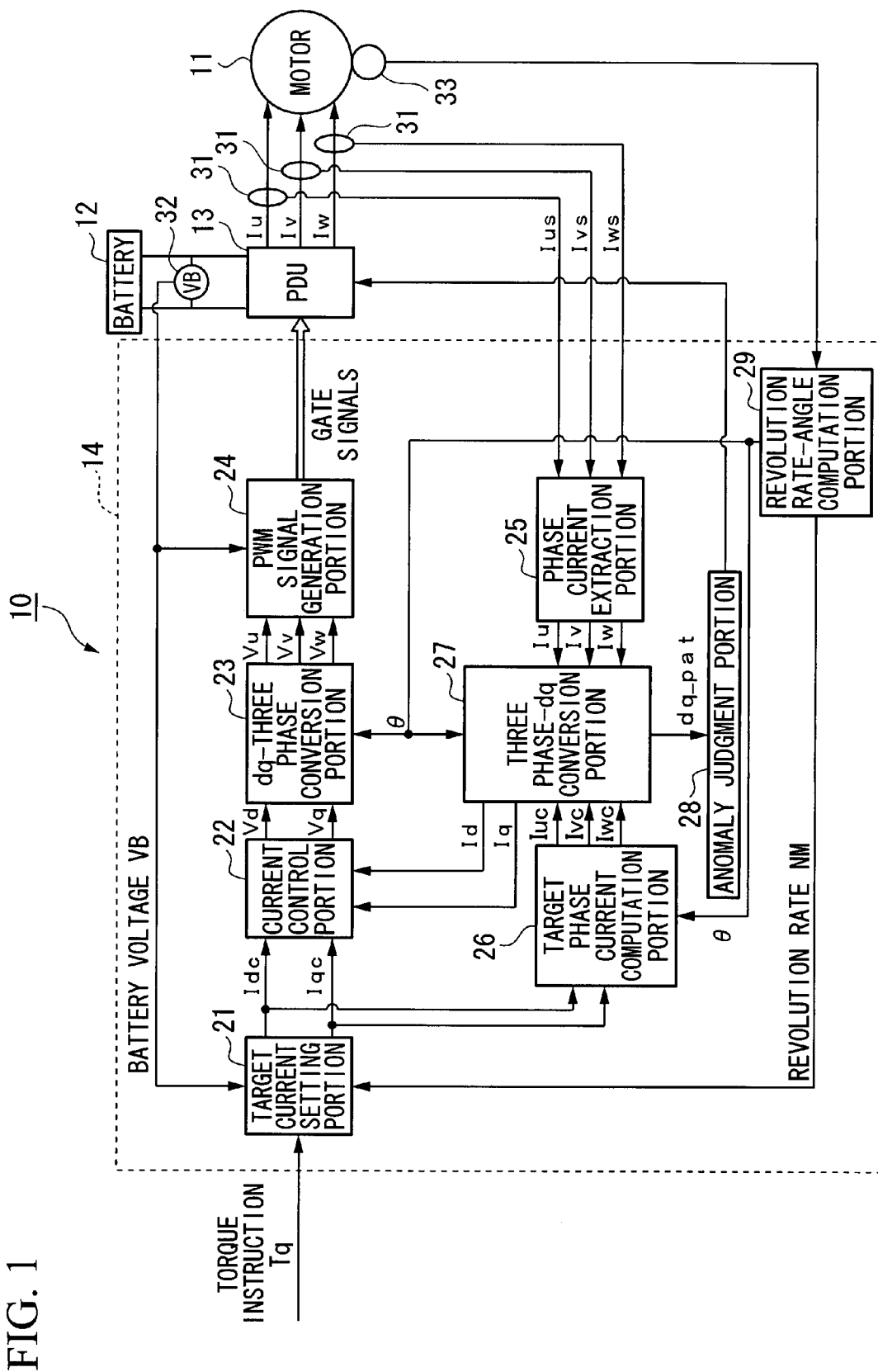
FIG. 1 shows a configuration of a motor control device according to one embodiment of the present invention.

As for example shown in FIG. 1, the motor control device 10 includes a power drive unit (PDU) 13 which employs a battery 12 as a DC power supply, and a control portion 14.

In this motor control device 10, driving and regenerative operations of the motor 11 with a plurality of phases (for example, the three phases U, V, W) are performed by the PDU 13 which receives control instructions output from the control portion 14.

The PDU 13 includes a PWM inverter which employs a pulse width modulation (PWM) including a bridge circuit which for example uses a plurality of transistor switching devices in a bridge connection, and a smoothing capacitor; the PDU 13 is connected to the motor 11 and to a high-voltage battery 12 which provides and receives electrical energy.

While driving the motor 11 and the like, the PDU 13 switches between the on (conducting) and off (cutoff) states of each of the transistors forming pairs for each phase in the PWM inverter based on gate signals (that is, PWM signals) which are switching instructions input from the control portion 14, and thereby converts the DC power supplied from the battery 12 into three-phase AC power. And through successive commutation to supply current to the stator windings of the three-phase motor 11, causes alternating U-phase current Iu, V-phase current Iv, and W-phase current Iw to flow in the stator windings for each phase.

The control portion 14 performs a feedback control of current in dq-coordinates, which form a rotating orthogonal coordinate system. The control portion 14 computes the d-axis current instruction Idc and q-axis current instruction Iqc based on a torque instruction Tq set according to, for example, the degree of acceleration resulting from operation of acceleration by the driver, calculates the output voltages Vu, Vv, Vw for each phase based on the d-axis current instruction Idc and q-axis current instruction Iqc, and inputs PWM signals which are gate signals, to the PDU 13 according to the output voltages Vu, Vv, Vw for each phase. Further, the control portion 14 converts two phase currents among the phase currents Iu, Iv, Iq actually supplied from the PDU 13 to the motor 11 into currents in dq-coordinates, and performs control such that the deviations of the d-axis current Id and the q-axis current Iq thus obtained from the d-axis current instruction Idc and q-axis current Iqc are each zero.

This control portion 14 includes, for example, a target current setting portion 21; a current control portion 22; a dq-three phase conversion portion 23; a PWM signal generation portion 24; a phase current extraction portion 25; a target phase current computation portion 26; a three phase-dq conversion portion 27; an anomaly judgment portion 28; and a revolution rate-angle computation portion 29.

Input to this control portion 14 are detection signals Ius, Ivs, Iws output from the current sensors 31, 31, 31 for each phase, which detect the phase currents Iu, Iv, Iw of the three phases output from the PDU 13 to the motor 11; detection signals output from the voltage sensor 32 which detects the terminal voltage of the battery 12 (power supply voltage) VB; detection signals output from the rotation sensor 33 which detects the rotor rotation angle θ of the motor 11 (that is, the rotation angle of the magnetic poles of the rotor from a predetermined reference rotation position); and torque instructions Tr output from an external control device (not shown).

The target current setting portion 21 computes current instructions specifying each of the phase currents Iu, Iv, Iw to be supplied to the motor 11 from the PDU 13, based on torque instructions Tr (for example, instruction values to cause the motor 11 to generate the torque required in response to the amount of operation of depression of the acceleration pedal by the driver) input from for example an external control device (not shown); the revolution rate NM of the motor 11 input from the revolution rate-angle computation portion 29; and the battery voltage VB output from the voltage sensor 32. These current instructions are output to the current control portion 22 as the d-axis target current Idc and q-axis target current Iqc in rotating orthogonal coordinates.

The dq-coordinates which form a rotating orthogonal coordinate system take for example the d axis (magnetic field axis) in the magnetic pole magnetic flux direction of the rotor permanent magnet, and take the q axis (torque axis) in the direction orthogonal to this d axis, and rotate in synchronization with the rotation phase of the rotor of the motor 11. With this, the d-axis target current Idc and q-axis target current Iqc, which are DC signals, are applied as current instructions for AC signals supplied to each of the phases of the motor 11 from the PDU 13.

The current control portion 22 calculates the deviation ΔId between the d-axis target current Idc and the d-axis current Id and the deviation ΔIq between the q-axis target current Iqc and the q-axis current Iq, and by means of, for example, a PI (proportional integration) operation according to the motor revolution rate NM input from the revolution rate-angle computation portion 29, performs controlled amplification of the deviation ΔId to calculate the d-axis voltage instruction value Vd, and performs controlled amplification of the deviation ΔIq to calculate the q-axis voltage instruction value Vq.

The dq-three phase conversion portion 23 uses the rotor rotation angle θ input from the revolution rate-angle computation portion 29 to convert the d-axis voltage instruction value Vd and q-axis voltage instruction value Vq in dq-coordinates into a U-phase output voltage Vu, V-phase output voltage Vv, and W-phase output voltage Vw, which are voltage instruction values in three-phase AC coordinates, which is a static coordinate system.

The PWM signal generation portion 24 uses pulse-width modulation based on for example the sine-wave output voltages Vu, Vv, Vw for each phase, a sawtooth-wave carrier signal, and a switching frequency, to generate gate signals (that is, PWM signals) which are switching instructions including pulses to drive and turn on/off each of the switching devices of the PWM inverter in the PDU 13.

The phase current extraction portion 25 extracts as physical quantities each of the phase currents Iu, Iv, Iw from the detection signals Ius, Ivs, Iws for each of the phase currents, detected by the current sensors 31, 31, 31.

The target phase current computation portion 26 uses the rotor rotation angle θ (deg) input from the revolution rate-angle computation portion 29 to calculate, using for example the conversion formula indicated in formula (1) below, each of the target phase currents Iuc, Ivc, Iwc for each of the phase currents, according to the d-axis target current Idc and q-axis target current Iqc output from the target current setting portion 21.

$$\begin{cases} Iuc = \sqrt{\frac{2}{3}} (Idc \times \sin(\theta + 90) + Iqc \times \sin(\theta + 180)) \\ Ivc = \sqrt{\frac{2}{3}} (Idc \times \sin(\theta + 330) + Iqc \times \sin(\theta + 60)) \\ Iwc = -Iuc - Ivc \end{cases} \quad (1)$$

The three phase-dq conversion portion 27 calculates the absolute values of the differences between the target currents Iuc, Ivc, Iqc calculated for each phase by the target phase current computation portion 26 and the phase currents Iu, Iv, Iw extracted by the phase current extraction portion 25, ΔIu=|Iuc−Iu|, ΔIv=|Ivc−Iv|, ΔIw=|Iwc−Iw| (current differences for each phase), and of these phase current differences ΔIu, ΔIv, ΔIw for the three phases, detects the phase corresponding to the phase current difference with the largest value. Then, among the phase currents Iu, Iv, Iw of the three phases which are currents in a static coordinate system, extracted by the phase current extraction portion 25, the phase currents for the two phases other than the phase corresponding to the largest phase current difference and the rotor rotation angle θ (deg) input from the revolution rate-angle computation portion 29 are used to calculate the rotating-coordinate currents (that is, the d-axis current Id and the q-axis current Iq in dq-coordinates) for the rotation phase of the motor 11 from one among the following formulas (2) through (4).

$$\begin{cases} Id = \sqrt{2} (Iu \times \sin(\theta + 60) + Iv \times \sin(\theta)) \\ Iq = \sqrt{2} (Iu \times \sin(\theta + 150) + Iv \times \sin(\theta + 150)) \end{cases} \quad (2)$$

$$\begin{cases} Id = \sqrt{2} (Iv \times \sin(\theta + 300) + Iw \times \sin(\theta + 240)) \\ Iq = \sqrt{2} (Iv \times \sin(\theta + 30) + Iw \times \sin(\theta + 330)) \end{cases} \quad (3)$$

$$\begin{cases} Id = \sqrt{2} (Iw \times \sin(\theta + 180) + Iu \times \sin(\theta + 120)) \\ Iq = \sqrt{2} (Iw \times \sin(\theta + 270) + Iu \times \sin(\theta + 210)) \end{cases} \quad (4)$$

For example, when the W phase current difference ΔIw is the largest among the phase current differences ΔIu, ΔIv, ΔIw for the three phases, the three phase-dq conversion portion 27 uses the above formula (2) to calculate the d-axis current Id and the q-axis current Iq based on the phase currents Iu, Iv corresponding to the U phase and V phase, excluding the W phase.

Further, of the phase current differences ΔIu, ΔIv, ΔIw for the three phases, when the U phase current difference ΔIu is the largest, the d-axis current Id and the q-axis current Iq are calculated using the above formula (3) based on the phase currents Iv, Iw corresponding to the V phase and W phase, excluding the U phase.

And, of the phase current differences ΔIu, ΔIv, ΔIw for the three phases, when the V phase current difference ΔIv is the largest, the d-axis current Id and the q-axis current Iq are calculated using the above formula (4) based on the phase currents Iu, Iw corresponding to the U phase and W phase, excluding the V phase.

The three phase-dq conversion portion 27 then sets the flag value of the control flag dq_pat according to the phase corresponding to the largest phase current difference detected from the phase current differences ΔIu, ΔIv, ΔIw for the three phases, and outputs the flag value to the anomaly setting portion 28.

For example, when the W phase current difference ΔIw is the largest, the three phase-dq conversion portion 27 sets the flag value of the control flag dq_pat to "0", sets the flag value of the control flag dq_pat to "1" when the U phase current difference ΔIu is the largest, and sets the flag value of the control flag dq_pat to "2" when the V phase current difference ΔIv is the largest.

When for example the flag value of the control flag dq_pat is unchanged over a predetermined time #TM, the anomaly judgment portion 28 judges that an anomaly is occurring in the current sensor 31 corresponding to the phase of this flag value, based on the flag value of the control flag dq_pat output from the three phase-dq conversion portion 27. The signal of this judgment result is for example input to the PDU 13, and is referenced during requests to execute the halting of current to the motor 11 and in other judgment processing.

The revolution rate-angle computation portion 29 extracts the rotation angle θ of the motor 11 from the detection signals output from the rotation sensor 33, and computes the revolution rate NM of the motor 11 based on the rotation angle θ.

The motor control device 10 of the present embodiment includes the configuration described above. Next, the operation of this motor control device 10, and processing to calculate the d-axis current Id and the q-axis current Iq from the phase currents of two phases among the phase currents Iu, Iv, Iw for three phases based on the detection signals of the current sensors 31, 31, 31, are explained referring to the attached drawings.

The series of processing in steps S01 to S19 described below are set so as to be executed repeatedly with a predetermined control period, for example, during execution of control operation of the motor 11.

Figure 2:
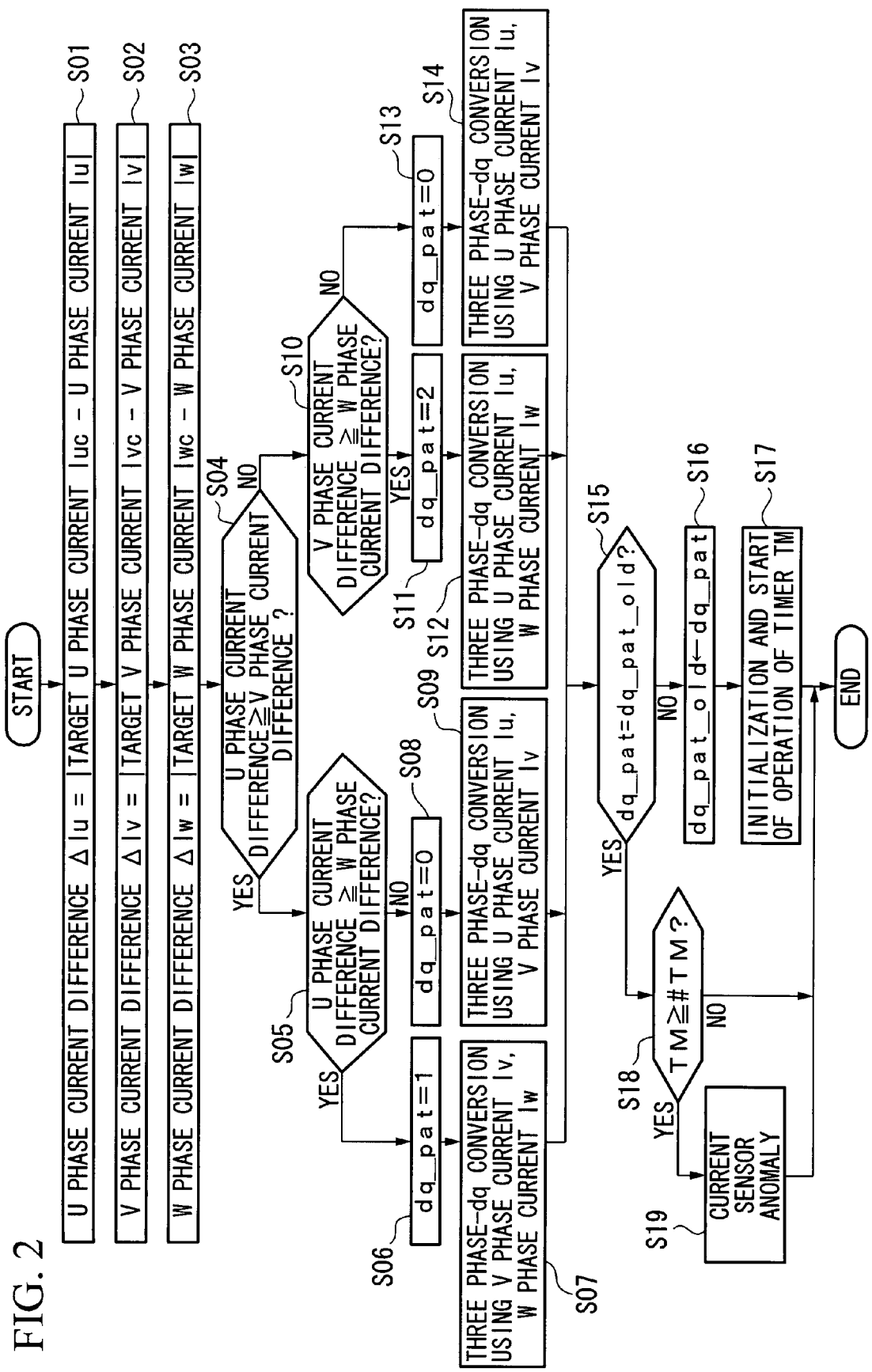
FIG. 2 is a flowchart showing an operation of the motor control device.

First, in step S01 shown for example in FIG. 2, the U phase current deviation ΔIu=|Iuc−Iu|, which is the absolute value of the difference between the U phase target current Iuc calculated by the target phase current computation portion 26 and the U phase current Iu extracted by the phase current extraction portion 25, is calculated.

Then, in step S02, the V phase current deviation ΔIv=|Ivc−Iv|, which is the absolute value of the difference between the V phase target current Ivc calculated by the target phase current computation portion 26 and the V phase current Iv extracted by the phase current extraction portion 25, is calculated.

Then, in step S03, the W phase current deviation ΔIw=|Iwc−Iw|, which is the absolute value of the difference between the W phase target current Iwc calculated by the target phase current computation portion 26 and the W phase current Iw extracted by the phase current extraction portion 25, is calculated.

Then, in step S04, a judgment is made as to whether the U phase current difference ΔIu is equal to or greater than the V phase current difference ΔIv. If the judgment result is "YES", then processing proceeds to step S05.

If on the other hand the judgment result is "NO", then processing proceeds to step S10, explained below.

Then, in step S05, a judgment is made as to whether the U phase current difference ΔIu is equal to or greater than the W phase current difference ΔIw.

If the judgment result is "YES", then processing proceeds to step S06.

If on the other hand the judgment result is "NO", then processing proceeds to step S08, explained below.

Then, in step S06, because the U phase current difference ΔIu is the largest among the phase current differences ΔIu, ΔIv, ΔIw for the three phases, the flag value of the control flag dq_pat is set to "1".

Then, in step S07, the d-axis current Id and the q-axis current Iq are calculated from the above formula (3) based on the phase currents Iv and Iw for the V phase and W phase, which are the two phases other than the U phase corresponding to the U phase current difference ΔIu, which is the largest, and processing then proceeds to step S15 described below.

On the other hand, in step S08, because the W phase current difference ΔIw is the largest among the phase current differences ΔIu, ΔIv, ΔIw for the three phases, the flag value of the control flag dq_pat is set to "0".

Then, in step S09, the above formula (2) is used to calculate the d-axis current Id and the q-axis current Iq based on the phase currents Iu, Iv for the U phase and V phase, which are the two phases other than the W phase corresponding to the W phase current difference ΔIw, which is the largest, and then processing proceeds to step S15 described below.

In step S10, a judgment is made as to whether the V phase current difference ΔIv is equal to or greater than the W phase current difference ΔIw.

If the result of this judgment is "YES", then processing proceeds to step S11.

If on the other hand the judgment result is "NO", then processing proceeds to step S13 described below.

Then, in step S11, because the V phase current difference ΔIv is the largest among the phase current differences ΔIu, ΔIv, ΔIw for the three phases, the flag value of the control flag dq_pat is set to "2".

Then, in step S12, the above formula (4) is used to calculate the d-axis current Id and the q-axis current Iq based on the phase currents Iu, Iw for the U phase and W phase, which are the two phases other than the V phase corresponding to the V phase current difference ΔIv, which is the largest, and then processing proceeds to step S15 described below.

On the other hand, in step S13, because the W phase current difference ΔIw is the largest among the phase current differences ΔIu, ΔIv, ΔIw for the three phases, the flag value of the control flag dq_pat is set to "0".

Then, in step S14, the above formula (2) is used to calculate the d-axis current Id and the q-axis current Iq based on the phase currents Iu, Iv for the U phase and V phase, which are the two phases other than the W phase corresponding to the W phase current difference ΔIw which is the largest, and then processing proceeds to step S15.

Then, in step S15, a judgment is made as to whether the flag value of the control flag dq_pat and the flag value of the previous cycle dq_pat_old, which is the value of the control flag dq_pat in the previous processing, are equal.

If the result of the judgment is "NO", then processing proceeds to step S16.

If, on the other hand, the judgment result is "YES", then processing proceeds to step S18 described below.

Then, in step S16, the previous cycle flag value dq_pat_old is set to the flag value of the control flag dq_pat for the current processing.

And, in step S17, counting of a timer in the stopped state is initiated, or the count value of a timer in the operating state is initialized and the timer operation is continued, and the series of processing ends.

In step S18, a judgment is made as to whether the timer value TM of the timer is equal to or greater than a predetermined time #TM.

If the judgment result is "NO", the series of processing ends.

If, on the other hand, the judgment result is "YES", then processing proceeds to step S19.

In step S19, it is judged that an anomaly is occurring in the current sensor 31 corresponding to the phase of the flag value of the control flag dq_pat, and the series of processing ends.

Figure 3:
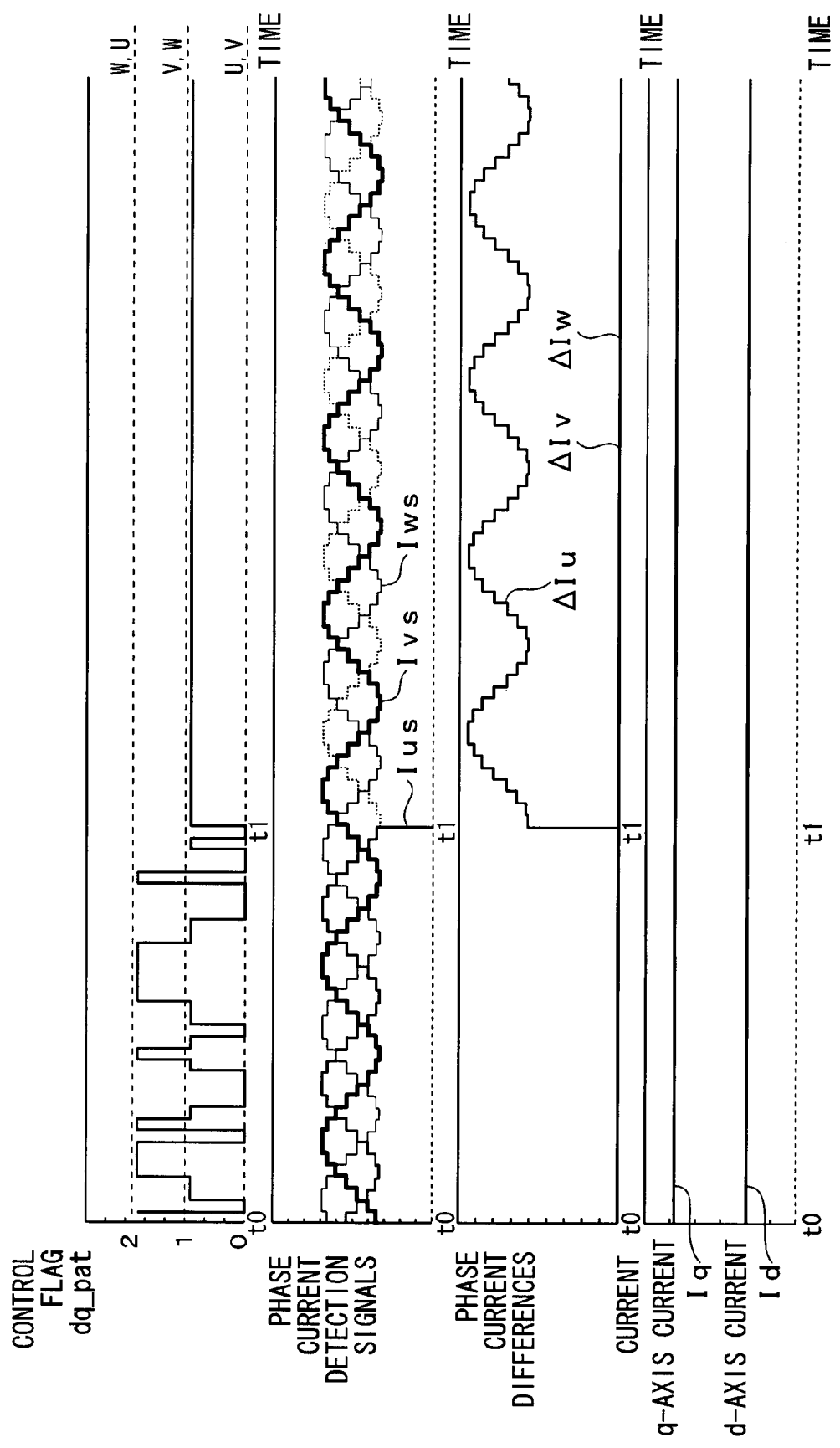
FIG. 3 is a graph showing an example of changes with time in control flag dq_pat, detection signals of phase currents Ius, Ivs, Iws, phase current differences ΔIu, ΔIv, ΔIw, and d-axis current Id and q-axis current Iq.

Through the series of processing of step S01 to step S19 described above, during for example the period from time t0 to time t1 shown in FIG. 3, if each of the current sensors 31, 31, 31 is normal, then the detection signals Ius, Ivs, Iws of the current sensors 31, 31, 31 are sinusoidal in shape, and the d-axis current Id and the q-axis current Iq which are DC signals, are calculated from the phase currents of two phases selected appropriately according to the relative magnitudes of the phase current differences ΔIu, ΔIv, ΔIw.

Then, after for example time t1 at which an anomaly occurs in the U phase current sensor 33, the detection signal Ius of this U phase current sensor 33 departs from a sinusoidal shape, the detection signals Ivs, Iws of the V phase and W phase current sensors 33, 33 are sinusoidal, and the U phase current difference ΔIu is always largest among the phase current differences ΔIu, ΔIv, ΔIw.

In this case, the flag value of the control flag dq_pat is fixed at "1", and the d-axis current Id and the q-axis current Iq which are DC signals, are calculated from the d-axis current Id and the q-axis current Iq based on the phase currents Iv, Iw of the V phase and W phase which are the two phases other than the U phase corresponding to the U phase current difference ΔIu which is the largest current difference.

As has been described above, according to the motor control device 10 of the present embodiment, two phases other than the phase corresponding to the largest phase current difference are extracted from the three phases, based on the current differences ΔIu, ΔIv, ΔIw which are the absolute values of the differences between the phase currents Iu, Iv, Iw extracted from detection signals of the current sensors 31, 31, 31 and the target phase currents Iuc, Ivc, Iwc for each phase, and the motor 11 is controlled based on the detection signals of the current sensors 31, 31 for these two phases. Hence with the appropriate timing of each execution of the series of processing for current feedback control of the motor 11, the motor 11 can be controlled appropriately based on current in two phases with relatively good feedback control following properties. By this device, even when for example there are fluctuations in the operating state of the PDU 13 or other control equipment due to temperature or other causes, the stability of current feedback control can be secured.

While a preferred embodiment of the invention has been described and illustrated above, it should be understood that this is an exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A motor control device comprising:
   current sensors which detect currents in each phase of a three-phase motor;
   a coordinate conversion device which computes a d-axis actual current and a q-axis actual current in dq-coordinates from phase currents of three phases based on detection values of the current sensors;
   a voltage instruction computation device which computes a d-axis voltage instruction and a q-axis voltage instruction based on a deviation between a d-axis current instruction and the d-axis actual current and on a deviation between a q-axis current instruction and the q-axis actual current;
   a target phase current computation device which computes target phase currents for each phase from the d-axis current instruction and the q-axis current instruction; and
   a current difference computation device which computes, for each phase, a current difference between the phase current and the target phase current, wherein
   the coordinate conversion device computes the d-axis actual current and the q-axis actual current from the phase currents for the two phases excluding the phase corresponding to the largest of the current differences among the current differences of the three phases.

2. The motor control device according to claim 1, further comprising
   an anomaly judgment device which judges that the current sensor is anomalous when the phase corresponding to the largest current difference among the current differences for the three phases is the same over a predetermined period.

3. The motor control device according to claim 1, wherein the phase current setting device continues an operation during controlling the three-phase motor.

4. The motor control device according to claim 3, further comprising
   an anomaly judgment device which judges that the current sensor is anomalous when the phase corresponding to the largest current difference among the current differences for the three phases is the same over a predetermined period.

5. A motor control method comprising:
   a detection step of detecting current detection values for each of phases of a three-phase motor;
   a first computation step of computing a d-axis actual current and a q-axis actual current in dq-coordinates from phase currents for the three phases, based on the detection values;
   a second computation step of computing a d-axis voltage instructions and a q-axis voltage instructions based on a deviation between a d-axis current instruction and the d-axis actual current and on a deviation between a q-axis current instruction and the q-axis actual current;
   a third computation step of computing target phase currents for each phase from the d-axis current instruction and the q-axis current instruction; and
   a fourth computation step of computing current differences between the phase currents and the target phase currents for each phase, wherein
   in the first computation step, the d-axis actual current and the q-axis actual current are computed from the phase currents for the other two phases excluding the phase corresponding to the largest current difference among the current differences for the three phases.

* * * * *